United States Patent [19]

Kawashima et al.

[11] Patent Number: 5,712,654
[45] Date of Patent: Jan. 27, 1998

[54] DATA EDITING METHOD AND APPARATUS THEREFOR

[75] Inventors: Yasumasa Kawashima; Shiro Nonaka; Shinji Tokumasu; Takayuki Ishikawa, all of Hitachi; Motomi Odamura, Katsuta, all of Japan

[73] Assignee: Hitachi, Ltd., Tokyo, Japan

[21] Appl. No.: 426,276

[22] Filed: Apr. 21, 1995

Related U.S. Application Data

[63] Continuation of Ser. No. 195,052, Feb. 14, 1994, abandoned, which is a continuation of Ser. No. 724,114, Jul. 1, 1991, abandoned.

[30] Foreign Application Priority Data

Jul. 6, 1990 [JP] Japan ............................ 2-177418

[51] Int. Cl.$^6$ ............................................. G09G 5/00
[52] U.S. Cl. ..................... 345/115; 364/188; 395/335; 395/348
[58] Field of Search .......................... 345/112, 113, 345/115, 117, 118, 119, 121, 122, 145, 146; 395/155, 159, 156, 140, 161, 326, 333, 335, 338, 348, 967, 968, 969; 364/188, 400–402

[56] References Cited

U.S. PATENT DOCUMENTS

| | | | |
|---|---|---|---|
| 4,315,315 | 2/1982 | Kossiakoff | 395/140 |
| 4,530,046 | 7/1985 | Munekata et al. | 364/474.24 |
| 4,813,013 | 3/1989 | Dunn | 364/488 |
| 4,827,404 | 5/1989 | Barstow et al. | 364/188 |
| 4,868,766 | 9/1989 | Oosterholt | 395/156 |
| 4,951,039 | 8/1990 | Schwendeman et al. | 345/122 |
| 5,021,976 | 6/1991 | Wexelblat et al. | 395/159 |
| 5,040,131 | 8/1991 | Torres | 395/156 |
| 5,121,319 | 6/1992 | Fath et al. | 364/188 |
| 5,134,560 | 7/1992 | Ferriter et al. | 395/159 |
| 5,212,635 | 5/1993 | Ferriter | 364/402 |

FOREIGN PATENT DOCUMENTS

A61-18035   6/1986   Japan.

OTHER PUBLICATIONS

*ACM Transactions on Graphics*, "constraint–Based Tools For Building User Interfaces", by A. Borning, Et al., vol. 5, No. 4, Oct. 1986.
Research Disclosure, "Animated Icons", No. 305, Sep. 1989 New York, U.S.

*Primary Examiner*—Steven Saras
*Attorney, Agent, or Firm*—Antonelli, Terry, Stout, & Kraus, LLP

[57] ABSTRACT

To edit data, a plurality of automatic processes are defined. Icons representing those processes may be displayed in a library frame of a display of the data editing system. The user may then select one or more of those processes by moving the corresponding icon from the library frame to an editing frame which also displays an image representing the data to be edited. When the user edits the data, each selected automatic process monitors the relationships between the data wherein, the corresponding icon provides a visual indication of the status of the automatic process. Preferably the progress of the automatic process is indicated by changes in the appearance of the corresponding icon. A generation frame may be provided on the display so that the user can generate new processes, represented by a corresponding icon, which may then be moved to the library frame or the editing frame. Icons may be grouped to permit simultaneous selection of a group of corresponding automatic processes.

34 Claims, 16 Drawing Sheets

30
Sleeping state

31
Monitoring state

32
Permission wait state

33
Action state

34
Warning state

Automatic editing process name

Monitoring target list

{

Monitoring processing (C language)

}

Editing target list

{

Action processing (C language)

DATA EDITING METHOD AND APPARATUS THEREFOR

This application is a continuation of Ser. No. 08/195,052 which is a continuation of Ser. No. 07/724,114, filed Feb. 14, 1994 and Jul. 1, 1991 respectively, both now abandoned.

BACKGROUND OF THE INVENTION

1. Field of the Invention

The present invention relates to a method and an apparatus for editing data. It is applicable to data in any form, but is particularly, although not exclusively, concerned with the case where the data is used to generate a graphics image, which is to be edited by a user. In the present specification, the term 'editing' should be given a wide meaning, as comprising any modification to the data, as the relationships between the data.

2. Summary of the Prior Art

In the simplest case, an editing system establishes a plurality of user-triggerable editing operations (editing commands), and the user then edits the data by selecting one of those editing commands to carry out a particular editing operation. When that editing operation has been completed, the user can then select the same or a different editing command for editing more of the data. In the case of a graphics image, where the amount of data is very large and the editing operations are complex, editing in this way will take a considerable amount of time.

Therefore, it is known to establish one or more "macro" commands for carrying out a series of editing commands, as a group, on a particular part of the data. In this way, the macro command enables the user to save time, since the separate editing commands do not have to be individually selected and their operation is carried out together. Of course, such a macro command has to be converted, by a suitable processing means, into the individual editing commands, but, by establishing such a macro command, the user need not worry about the separate editing commands needed to carry out a particular editing operation determined by the macro command.

Such a system is known in conventional Computer Aided Design (CAD) systems, an example of such a system is disclosed on pages 18 and 19 of "Concept Station Catalog" (by Dentsu International Information Service, Ltd. Nov A RDE 903C1 3000, November, 1989). Similarly, a manual entitled "Drawing System HICAD/DRAFT/W User Interface" from Hitachi, Ltd., (2050G Manual 205G-7-602, July 1988) discussed an arrangement in which new commands can be added as desired by the user.

In such systems, of course, the macro commands comprise only those operations which have been combined by the user.

It is also known to provide automatic editing operations, although in such cases the automatic editing operations are normally routine. Automatic editing system is disclosed in e.g. "A Knowledge-Based Cooperative Information Processing Method" from the Information Processing Society Thesis Journal Vol. 30, No. 4, pages 427 to 438, April 1989). In this disclosure, a train schedule was created as an automatic process, using a tree-structure of routine operations.

In conventional data editing system, as discussed above, the user is required to issue commands for editing the data at appropriate times depending on the nature of the editing being carried out, and this causes a number of problems.

Firstly, the user is required to understand how to use a large number of commands, and to trigger their operation at appropriate times. Secondly, a large number of editing operations need be carried out, and although macro commands may be used, this does not wholly solve this problem. Thirdly, although macro commands can be generated for a series of editing operations, the rules of those commands are then fixed, and changes in the data may render the macro commands inoperative. Fourthly, it is necessary that the user known all the commands which are necessary for a particular type of editing, with the risk that an inexperienced user may miss an essential command. Furthermore, many editing operations are used only rarely, and thus the user must remember all the commands that are available.

SUMMARY OF THE INVENTION

The present invention addresses the above described problems, of the conventional system and tries to overcome them. In practice, it is not normally possible for these problems wholly to be overcome, since some depend on the nature of the editing operation itself. For example, no matter how reliable the system, it cannot wholly prevent an inexperienced user from omitting an important operation. However, the present invention seeks at least to ameliorate at least some of these problems.

In a first aspect, the present invention proposes that a plurality of automatic operations be defined for investigating relationships between the data to be edited. Then, the user can select one or more of those automatic operations, edit a particular part of the data, and investigate the relationships of that part of the data which has been edited using the automatic operation. Then, a visual indication of the status of the selected automatic process is given on the same display as that carrying an image of the data which is being edited.

Consider now a simple case of an application of this first aspect of the present invention, in which the user wishes to check that a particular relationship is maintained amongst the data, even after that data has been edited. Firstly, the user selects the automatic process which checks that relationship, and then the user can carry out any desired editing operation. Such editing will then cause the selected automatic operation to check on the particular relationship, and the display will indicate by the visual indication associated with that automatic operation whether the relationship is maintained or not. Thus, for example, in design of office lay-out, it may be desired to maintain a minimum amount of space per person, and the automatic operation can check that any re-arrangement of the lay-out does not cause the amount of space per person to fall below that minimum.

At its simplest, the visual indication given by the first aspect of the present invention may simply indicate that the selected automatic process is operating. However, it is desirable that the user is presented with more information than this, and a second aspect of the present invention proposes that the visual indication is in the form of an icon which then changes as the automatic operation progresses. This aspect of the present invention is applicable to an arrangement in which there is only one automatic process, so there is no selection as in the first aspect of the present invention, and thus the second aspect is independent of the first. However, the two may be used in combination.

The above discussion of the second aspect of the present invention referred to an icon, as a form of visual indication. It should be noted that, in the present specification, the word "icon" is used in a wide sense represent an image component in the form of a graphic element and/or a word or words, and the present invention is not limited to any particular form of icon.

Many possible automatic processes may be used with the present invention. In the simplest case, an automatic process may be provided which merely monitors the relationship between the data, or part of the data, and generates a suitable visual indication of its status (e.g. by a changing icon), and then generates a message to the user. However, it may be desirable to use an automatic process which itself performs an editing operation on the data, so as e.g. to ensure that the data conforms to a predetermined rule irrespective of the editing by the user. Thus, in the example of editing of an office lay-out mentioned above, an automatic process could be defined which ensures that furniture items do not block doors or other routes. The automatic operation could then move furniture items automatically to prevent this occurring, when the user changes the position of doors in the lay-out. Indeed, these two possibilities could be combined, in that the automatic operation could be arranged to edit the data automatically, if that were possible within predetermined limits, and to generate a message to the user when such automatic editing within those limits was not possible.

It is desirable that the actual indication (icon) is located relative to the image on the display at a point which gives a linking between the part of the data which the automatic operation investigates and the image of that part of the data. This presents the user with a more immediate visual relationship between the automatic operation and that part of the data on which it acts. This is particularly important where the automatic operation is to edit data which the user proposes to edit, in which case the visual indication (icon) should be located proximate the cursor which indicates the part of the image corresponding to the data which the user is editing. Alternatively, when two automatic processes edit the same data (dependent on different relationships), then the visual indications (icons) of those two automatic processes should be located adjacent each other.

Where there are a plurality of automatic processes, and the user selects one or more of them, it is desirable that there is a part of the display in which icons corresponding to the available processes are displayed, so that the user may readily select the appropriate process by selecting the corresponding icon. The user may identify a process to be selected by identifying the corresponding icon. Then the user generates a signal causing that icon to be moved to the part of the display associated with the image of the data to be edited, indicating the selection of the corresponding process. This idea of moving or "dragging" an icon may be used with either the first or second aspect of the present invention discussed above, but is also independent and thus forms a third aspect of the present invention.

In more complex systems, where there are a large number of processes, it may not be practicable to display an icon corresponding to all the available processes in the appropriate part of the display. In this case, the processes may be grouped, and only the icons corresponding to a selected group are then displayed at any time. The user selects one of the groups, the appropriate icons are displayed, and then the user may select one or more of the automatic operations corresponding to the icons then displayed.

In a further development, it is possible to link together processes to enable more than one to be selected at the same time, in which case a "group" icon may be formed which, when moved, causes the movement of those icons which belong to the group corresponding to the group icon, and then all the automatic processes corresponding to the icons belonging to the group identified by the group icon are then selected.

Although the processes which investigate the relationships between the data are automatic, it may be possible for the user to inhibit the start of a particular process. This may be useful, for example, where the user intends to carry out a series of related editing operations, and wants the automatic process to operate only when the series of automatic operations has been completed. The inhibited automatic process may then be triggered by a suitable start instruction from the user. In a system according to the present invention, the automatic processes may all be defined in advance, or it is possible for the user to create one or more further automatic processes by combining existing processes in a manner similar to the "macro" instructions discussed earlier. A further visual indication (icon) may then be associated with the newly-created automatic process.

It should be noted that the present invention relates to both method and apparatus aspects of the present invention.

BRIEF DESCRIPTION OF THE DRAWINGS

Embodiments of the present invention will now be described in detail, by way of example, with reference to the accompanying drawings, in which.

DETAILED DESCRIPTION

First, the general principles of the present invention will be described with reference to FIGS. 1 to 6.

The present invention as described in FIGS. 1 to 6, forms an interactive data editing system which has a plurality of automatic processes and in which the user edits or processes data interactively. The system has automatic process libraries, and automatic processes loaded in the libraries that may be selected, released, or generated during data editing. Individual routine operations may then be performed by the automatic processes, and data can be interactively edited by the user (operator) only when a higher level editing decision is required. Hence, non-routine operations can be performed efficiently. The word "editing" in the present specification includes not only "editing" in the narrow sense of deleting data, but as also "processing", "generation" and/or "evaluation" of the data. Thus, editing includes general data processing in a wide sense.

Figure 1A:
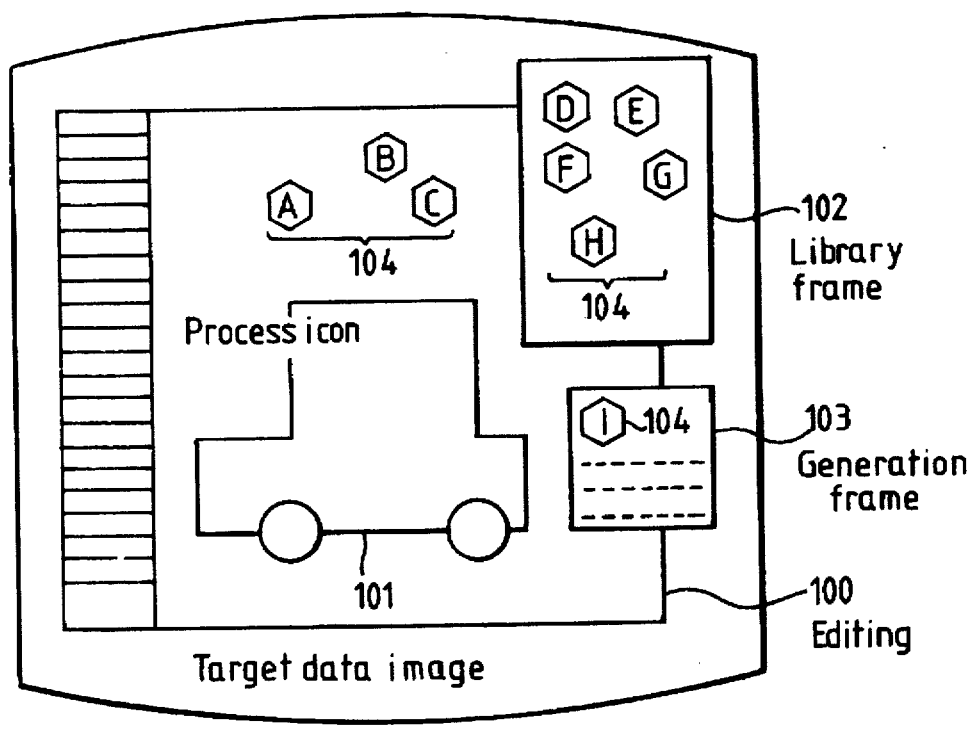
FIGS. 1(a) to (c) illustrate a display which may be able generated by an embodiment of the present invention, FIG. 1(a) illustrating the whole of the display and FIGS. 1(b) and 1(c) illustrating parts of the display of FIG. 1 in more detail.

FIG. 1 shows a display of an interactive Computer Aided Design (CAD) system embodying the present invention. Although the present invention has wide application, the interactive CAD system of FIG. 1 as a typical example. As shown in FIG. 1(a), an interactive screen has a display including an editing frame 100 on which the target data (for example, data representing the shape of the loading of an automobile is displayed as an image 101). The display also has a library frame 102 displaying visual indications representing automatic processes for automatically performing individual operations (for example, wheel base calculation, which is an example of a routine partial task in the design of an automobile body), and an automatic process generation frame 103 for generating new automatic processes. The automatic processes are illustrated on the screen by icons 104, which are located on the editing frame 100, the library frame 102, or the generation frame 103 depending on the process. As will be discussed in more detail below, the position of each of the icons 104 indicates whether the corresponding automatic process is activated, or not. Thus, when the automatic processes corresponding to the icons 104 within the editing frame 100 are currently active a plurality of libraries may be created, each containing a plurality of automatic processes, and then the corresponding icons are selectively displayed in the library frame 102.

Figure 1B:
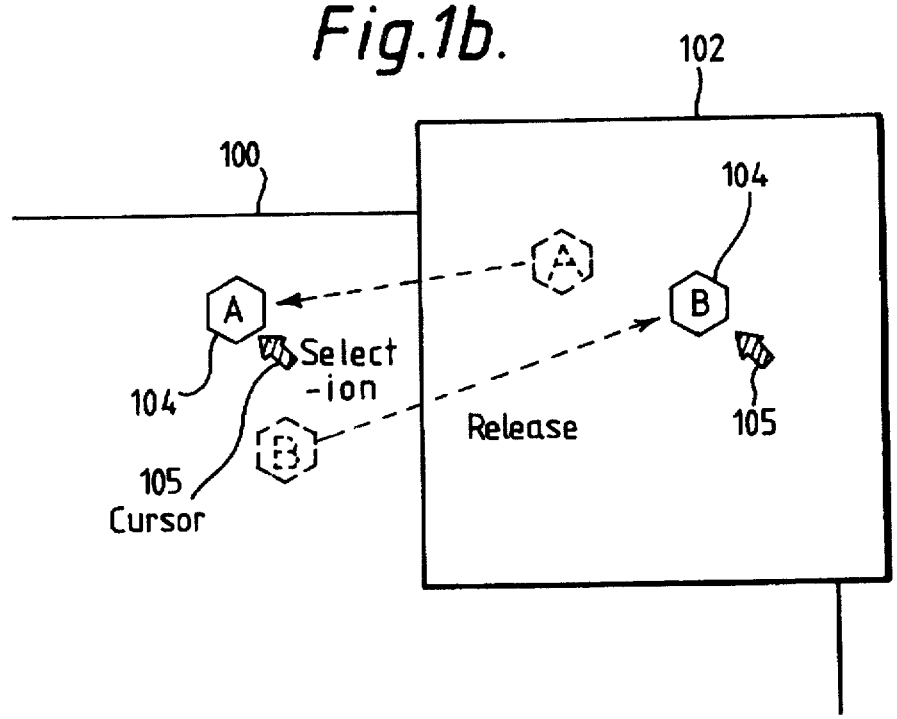

FIG. 1(b) shows a method for determining an automatic process to be operated by moving (hereinafter 'dragging') an icon 104 identifying an automatic process from the library frame 102 to the editing frame 100. A cursor 105 is used to specify the icon 104 which is to be dragged from the library frame 102 to the editing frame 100, thereby selecting the corresponding automatic process for activation. Alternatively, an icon may be dragged from the editing frame 100 to the library frame 102, thereby canceling the activation of the corresponding automatic process.

Figure 1C:
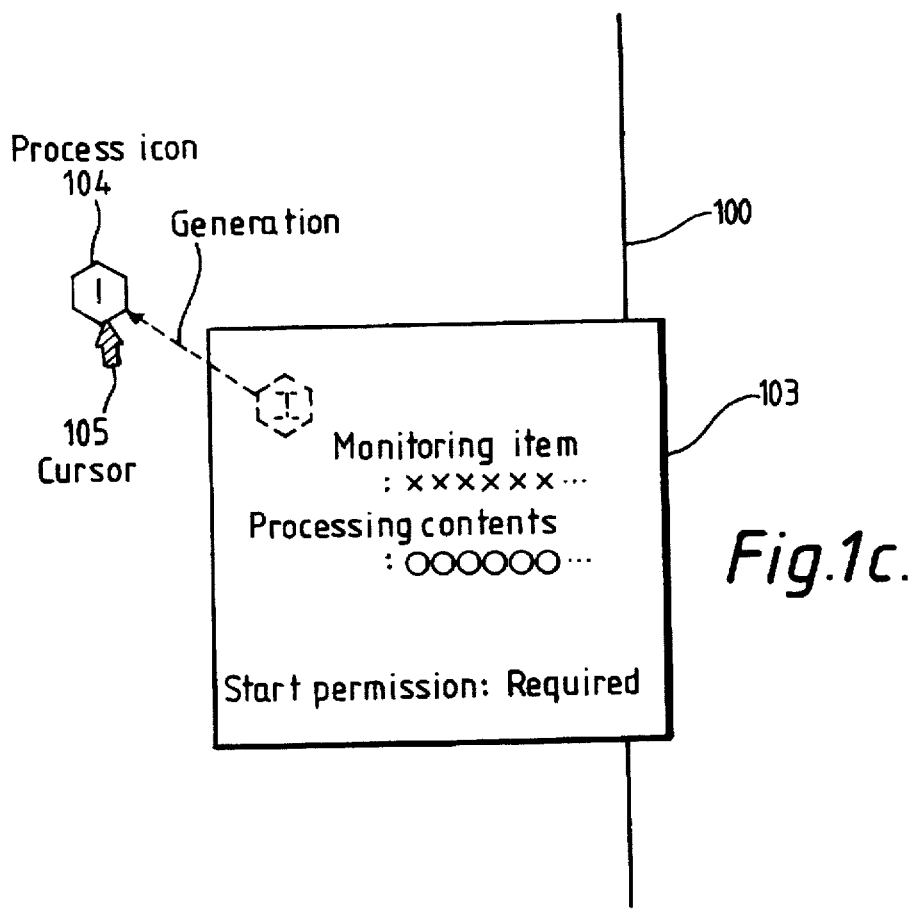

FIG. 1(c) shows an example of the generation of an automatic process. Automatic process definition data is established within the generation frame 103, which data will define the automatic process to be carried out, and the automatic process is activated by moving the process icon 104 from the generation frame 103.

This embodiment has the advantage that any activated automatic process is clearly indicated by a corresponding icon and the user can recognize it easily. By replacing "selection", "release", or "generation" of an automatic process with a graphic operation, the operation efficiency improved.

The icon 104 preferably changes in shape in dependence on the progress of the automatic process (for example, the process may have a sleeping status, monitoring status, permission wait status, or action status as will be discussed later). Therefore, the shape or configuration of the icon helps to inform the user of the decision(s) needed.

Figure 2:
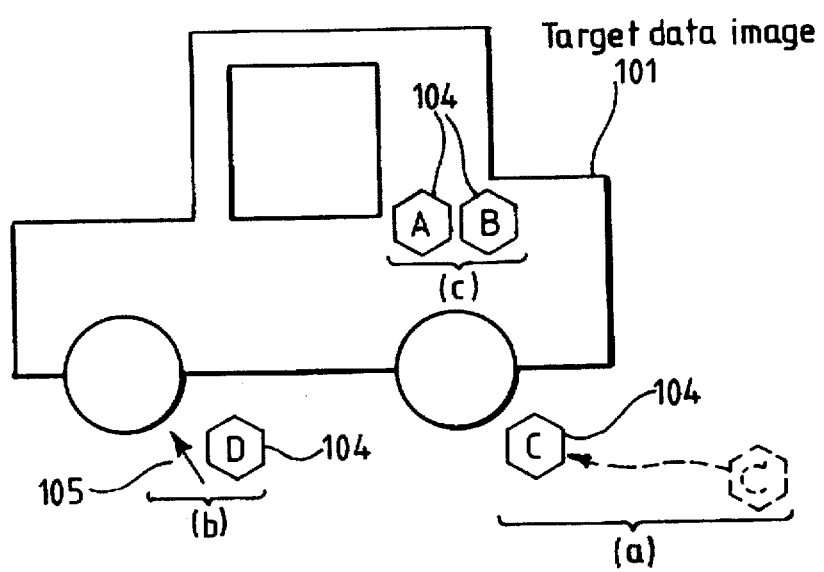
FIG. 2 illustrates part of a further display according to the present invention.

FIG. 2 shows the mutual interaction of the target data, user, and an automatic process of the present invention using the interactive CAD system discussed above as an embodiment of the appearance of the display. The mutual interactions may be as follows:

Monitoring or processing the particular location of the target data by the user or the automatic process Competition for the target data between the user and the automatic process Part (a) in FIG. 2 shows an example in which an icon 104 moves to a position near to the particular location of the corresponding target data; this action indicates that the automatic process is to monitor or process data corresponding to that particular location. Part (b) in FIG. 2 shows the appearance of the display when there is data competition between the user and the automatic process. The icon 104 corresponding to the automatic process moves in synchronisation with the movement of the cursor 105 (the cursor 105 being controlled by the user). Part c in FIG. 2 shows an example in which there is data competition between two automatic processes; this is indicated by a synchronised movement of the corresponding icons 104.

Since this arrangement indicates to the user that the processes are related, not as a sentence but by the relative positions of the icons, the arrangement has the advantage that the user may appreciate the relationship rapidly.

By indicating the temporal or spatial relationship between the operation of the particular automatic process(es) and changes in the target data caused by the operation of the automatic process(es) on the display, the user may understand visually the operation of the automatic process(es) and changes in the target data, and a user friendly system can be constructed.

FIG. 3 shows an embodiment in which automatic processes are grouped.

Figure 3A:
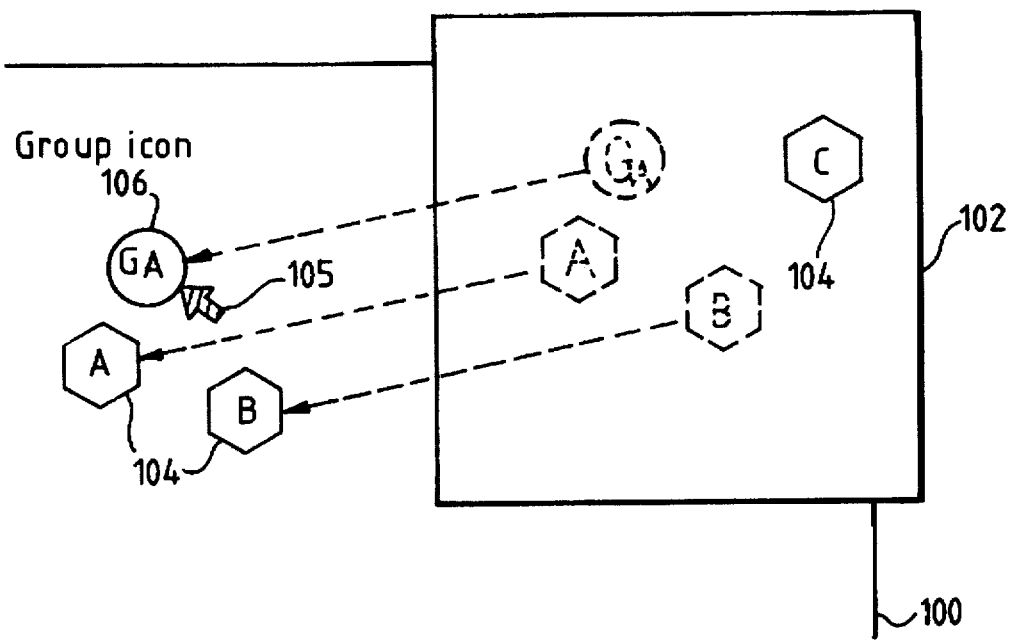
FIGS. 3(a) and (b) illustrate further modifications of the display of FIG. 1.

In FIG. 3(a), the display shows a group icon 106 corresponding to the group containing automatic processes A and B. The automatic processes A and B are simultaneously selected by dragging the group icon 106 from the library frame 102 to the editing frame 100. As a result, the icons 104 corresponding to processes A and B are dragged to the editing frame 100 together. When the group icon 106 is moved back to the library frame, the processes of the group are simultaneously disactivated. When selecting a group of automatic processes, automatic processes, which have already been selected, need not be selected again.

Figure 3B:
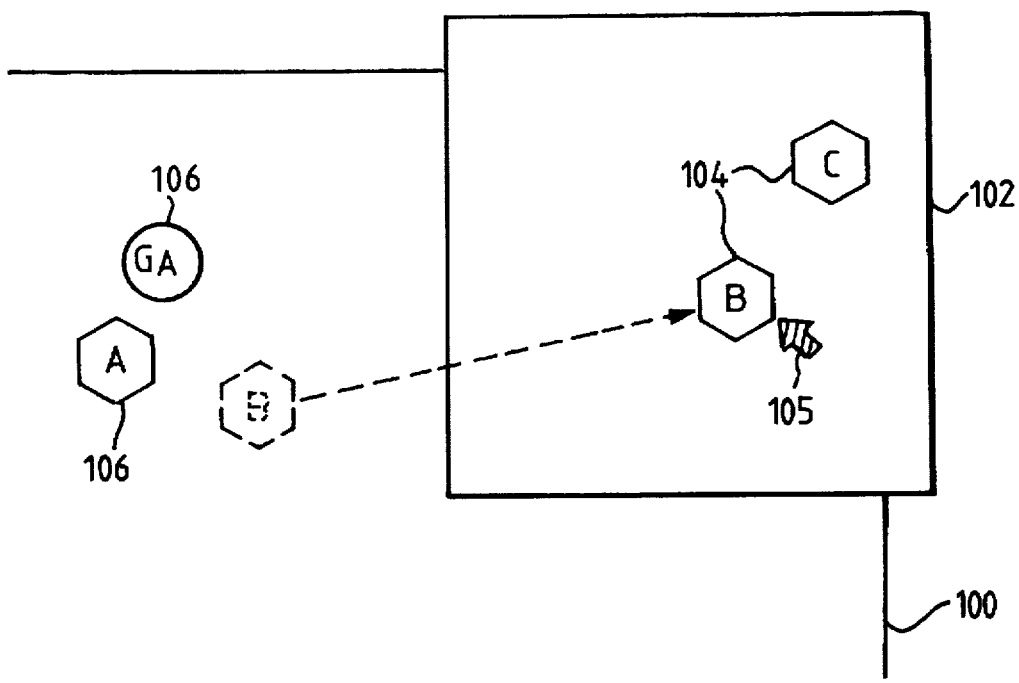

FIG. 3(b) shows a method for releasing one of a group of automatic processes which have been selected by the operation described with reference to FIG. 3(a). In this case, the icon 104 corresponding to process B is dragged back to the library frame 102.

This embodiment has the advantage either a group automatic processes of the group members can be activated or disactivated together, or a single process of that group can be operated.

Figure 4:
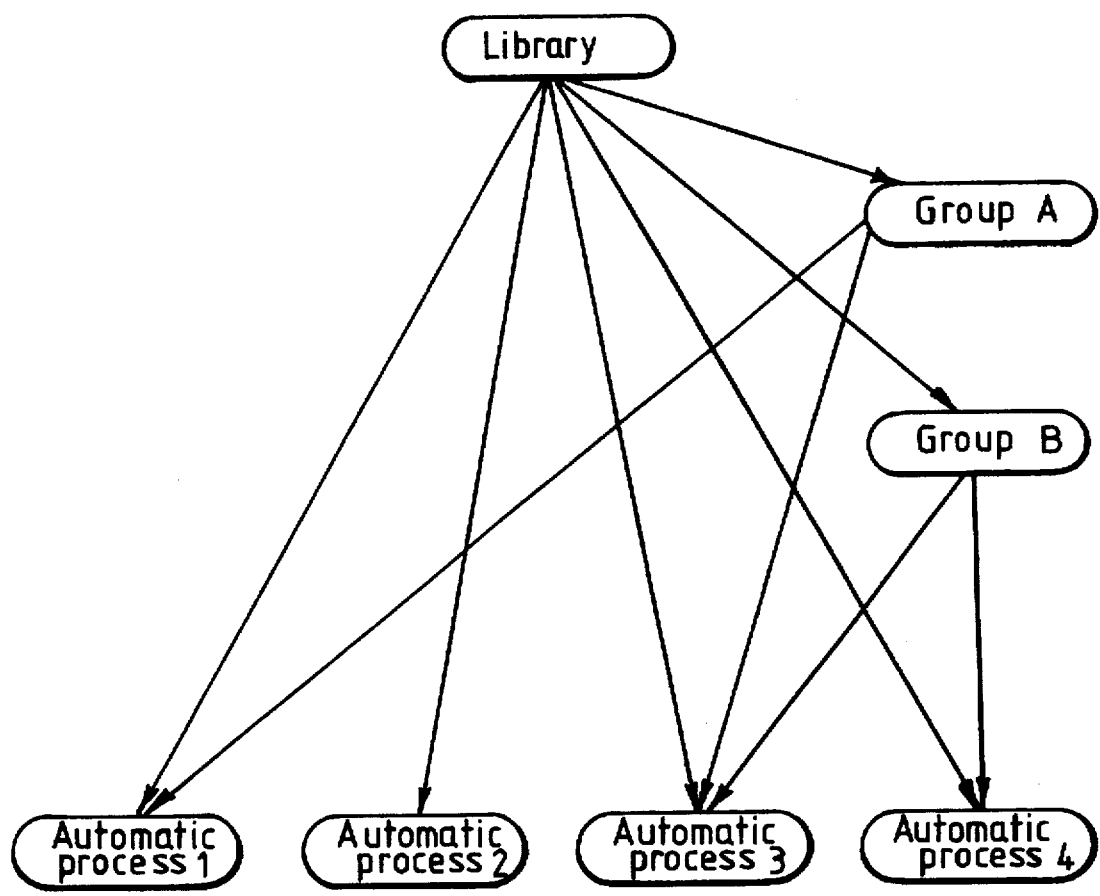
FIG. 4 shows the configuration of a library for storing automatic processes.

FIG. 4 shows an example of the configuration of an automatic process library. This example shows the relationship between the library, groups, and automatic processes as a multiple tree structure. In a simple tree structure, the relationship between these items is fixed, while in a multiple tree structure, a flexible combination of automatic processes is available according to interaction with the user, and data can be edited or processed efficiently and correctly.

Figure 5:
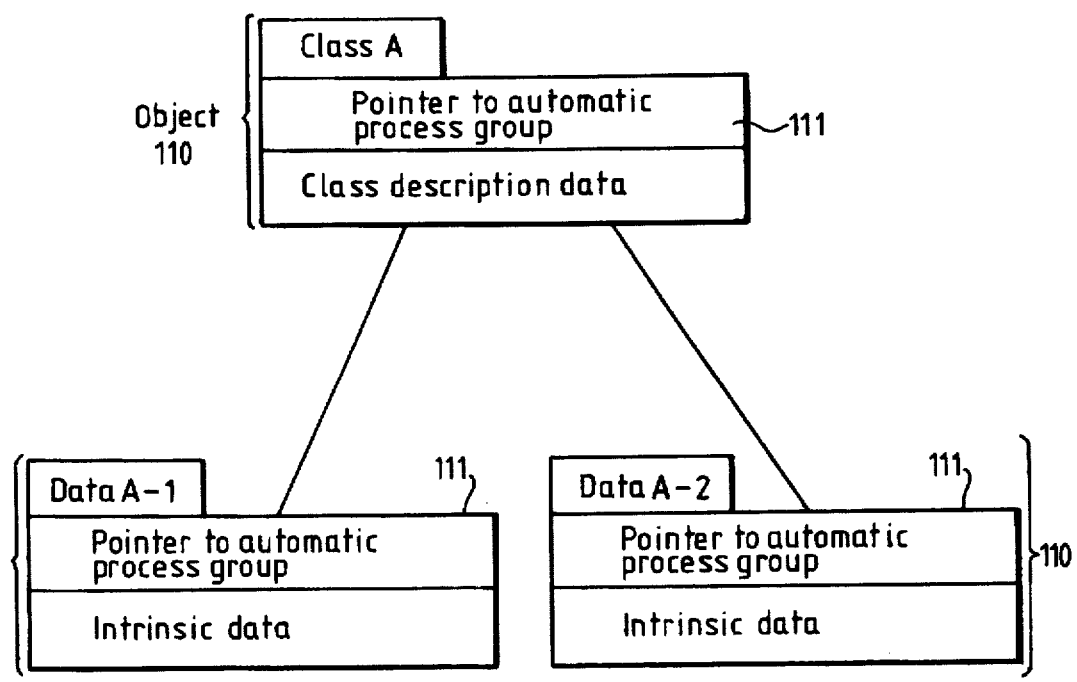
FIG. 5 is a block diagram for explaining the operation of an embodiment of the present invention.

FIG. 5 shows a method for linking the target data to a corresponding automatic process. The target data is assumed to have an object-oriented hierarchical structure. In this arrangement, the data of an object 110 has a pointer 111 to the corresponding automatic process group. When the user specifies the object 110 of the target data to be edited or processed, the automatic process group member indicated by the pointer 111 is automatically selected.

In this arrangement, when an object of the target data is specified, the automatic process group can also be selected automatically. Therefore, the arrangement has the advantage that the automatic process control is efficiently performed and the number of user operations may be minimized.

Figure 6A:
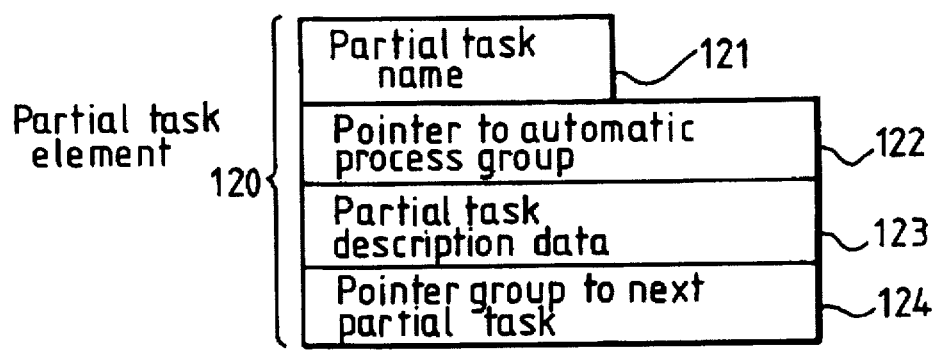
FIGS. 6(a) and 6(b) shows editing by means of an automatic process, in accordance with the present invention.
Figure 6B:
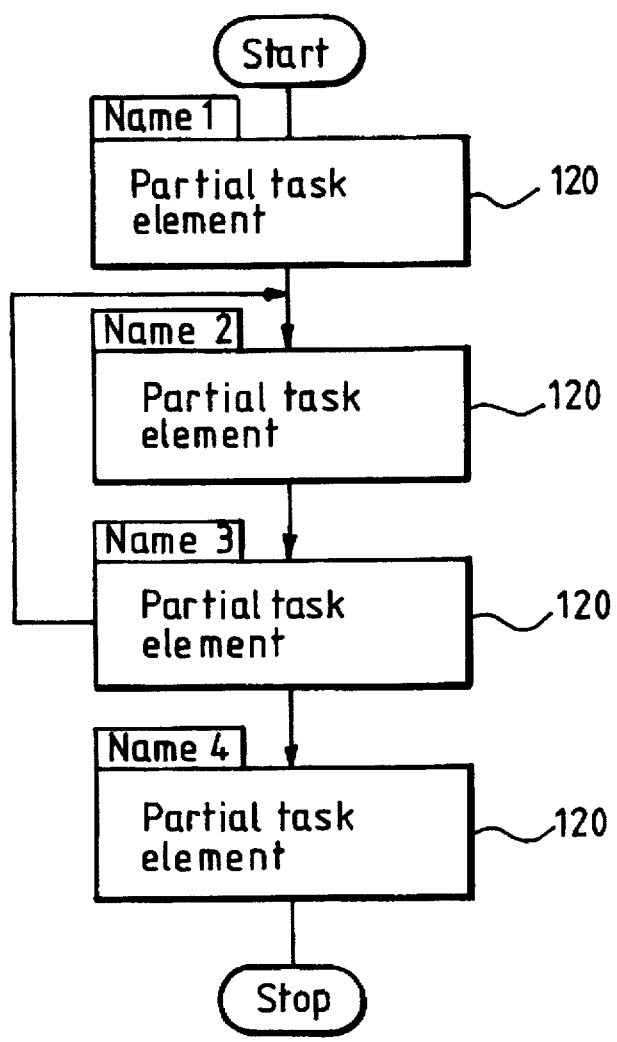

FIG. 6 shows a method for corresponding the editing procedure data to the automatic process. In this example, the operation procedure data is indicated as a flow chart in FIG. 6(b) having partial task elements 120 shown in FIG. 6(a) as components thereof. The partial task elements 120 comprise a partial task name 121, a pointer 122 to the corresponding automatic process group, partial task descriptive data 123, and a pointer group 124 to the next partial task to be performed. The partial task descriptive data 123 comprises the contents of the information to be displayed on the display, information specific to the target data, and partial task end conditions. When the user performs the operations, following the flow chart and reaches the step corresponding to each partial task, the screen target data thereof are indicated on the screen, and the automatic processes which are additionally required are selected and activated.

This has the advantage that, since a wider and fixed operation procedure can be automated by the flow chart, and furthermore partial non-routine tasks can be automated by the automatic process, the entire operation may be more fully automated.

In the above arrangements, the automatic process libraries used are all visible. However, this is not essential. If the user is an expert and understands the automatic processes loaded, he can select, release, or generate automatic processes by direct input (using a mouse or keys). It is not always necessary to have generation frame 103 for the automatic generation of processes but such a frame 103 may be formed in dependence on the data editing or processing to be carried out.

Figure 7:
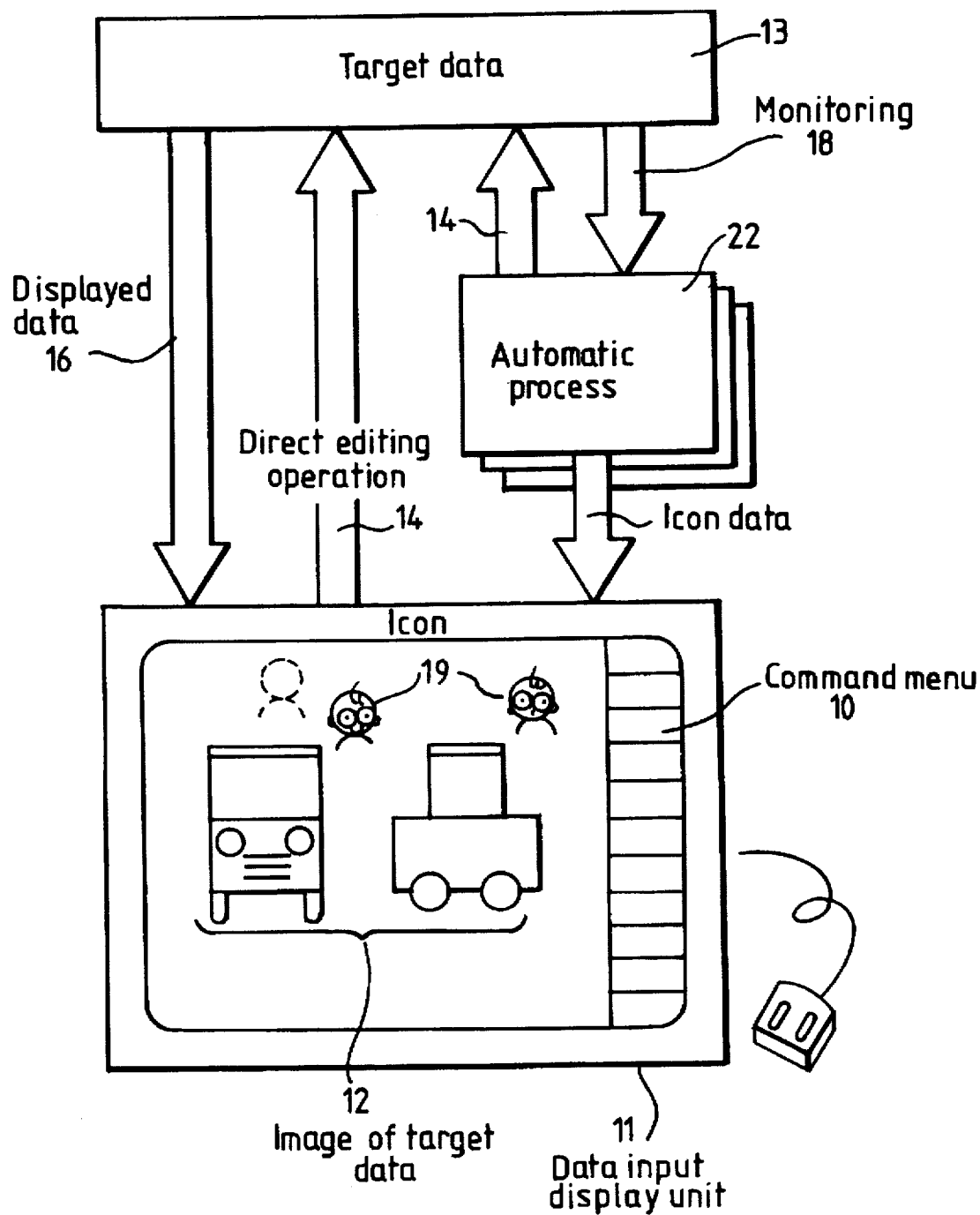
FIG. 7 shows a further embodiment of the present invention.

FIG. 7 shows the configuration of an example of an interactive data editing apparatus according to another embodiment of the present invention.

The interactive data editing apparatus shown in FIG. 7 comprises a data input display unit 11 and target data 13, and a plurality of automatic processes 22. The automatic processes 22 operate independently in parallel and always monitor (as indicated by arrow 18) the status of the target data 13. When the user edits the target data 13 and the data is put into a predetermined state which is intrinsic to each automatic process 22, each automatic process 22 carries out a corresponding editing operation 14. Icons 19 is displayed on the display in corresponding with each automatic process 22 and the icon 19 changes in position and shape according to the status of each corresponding automatic process 22. Since the automatic processes 22 may perform actions automatically, even if the user enters no specific command, the user does not need to memorize all the commands. By noting the position and shape of the icon 19, the user can check visually the status of each automatic process 22.

The icon 19 may be personified and the expression, clothing, belongings, position, and posture thereof may change according to the status of the automatic process, the user can consider the automatic process as being equivalent to a person. As a result, the operation and status of the automatic process can be understood more easily (the idea of a personified icon is disclosed in Japanese Patent Application Laid-Open No. 61-18035).

The icon position is determined on the basis of the location of the data which is to be edited by the corresponding automatic process. As a result, the icon, for example, can always be located near the location of the corresponding data and the user can immediately recognize the data to be acted on by each automatic process.

Each automatic process operates using parametric data parameters as a target for monitoring or action. Since the partial parameters of the parametric data are corrected, the entire shape is continuously corrected, the amount of data to be monitored by the automatic process can be restricted.

Next, the action of each automatic process and a further example of an automatic process library will be described.

Figure 8:
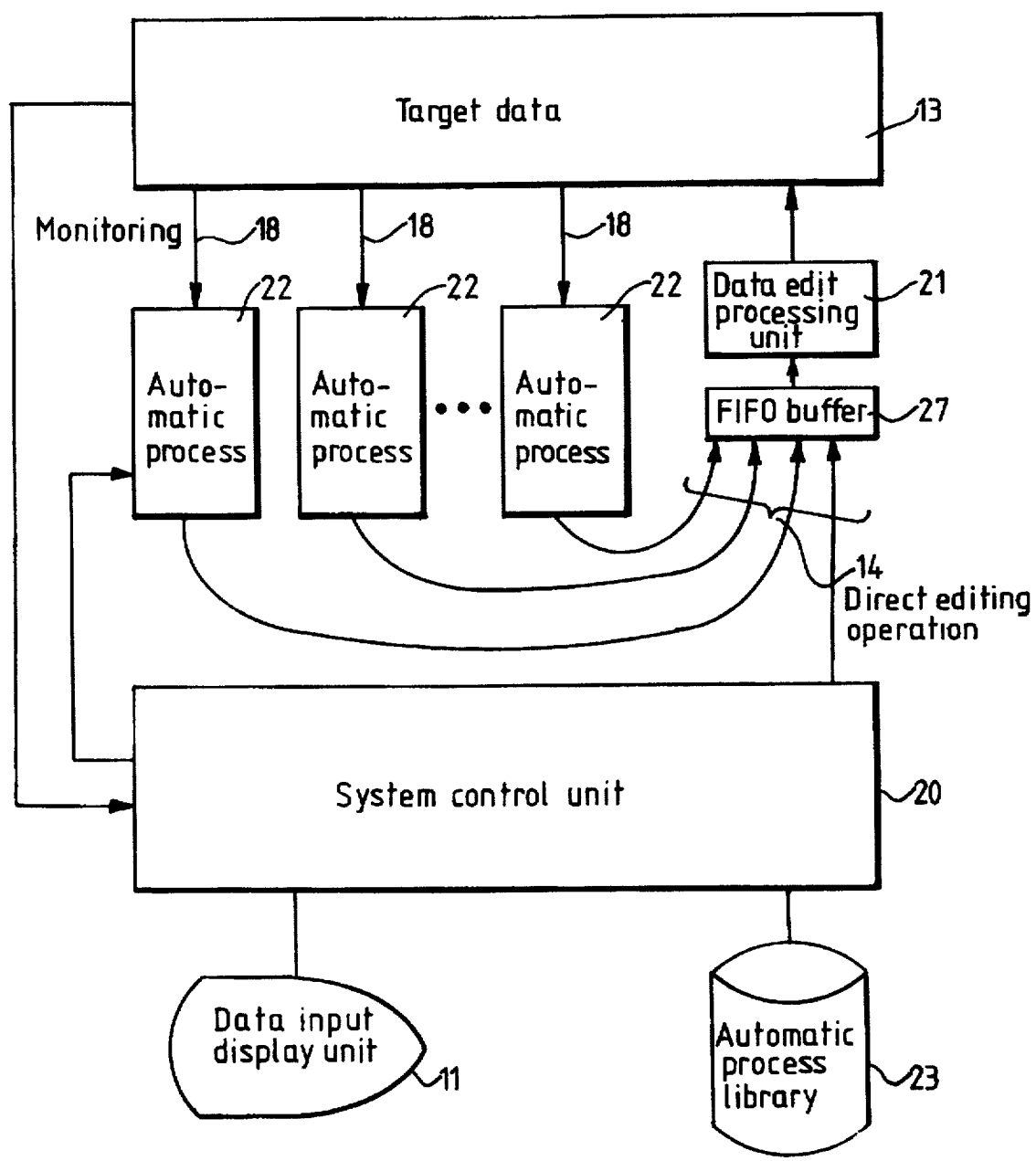
FIG. 8 is a block diagram for illustrating the operation of the embodiment of FIG. 7.

FIG. 8 shows an example in which automatic processes are operated in parallel in a multitask processing computer, treating each automatic process as a task. As illustrated, the editing system comprises a system control unit 20 for processing user commands or generating or erasing automatic processes, target data 13 located in a common memory, a plurality of automatic processes 22, a data edit processing unit 21, and a FIFO buffer 27. The monitoring operation 18 of each automatic process 22 is performed by referring directly to the common memory. Actions are performed in a batch by sending an instruction for a direct editing operation 14 to the data edit processing unit 21. An automatic process library 23 is used as a file for accumulating a plurality of execution programs.

The automatic process library stores a plurality of automatic processes, and the user can selectively operate one of them by "selecting" or "releasing" it. Therefore, the automatic processes can be created or controlled separately from the rest of the system so as to prevent it to be expanded as much as possible.

Figure 9:
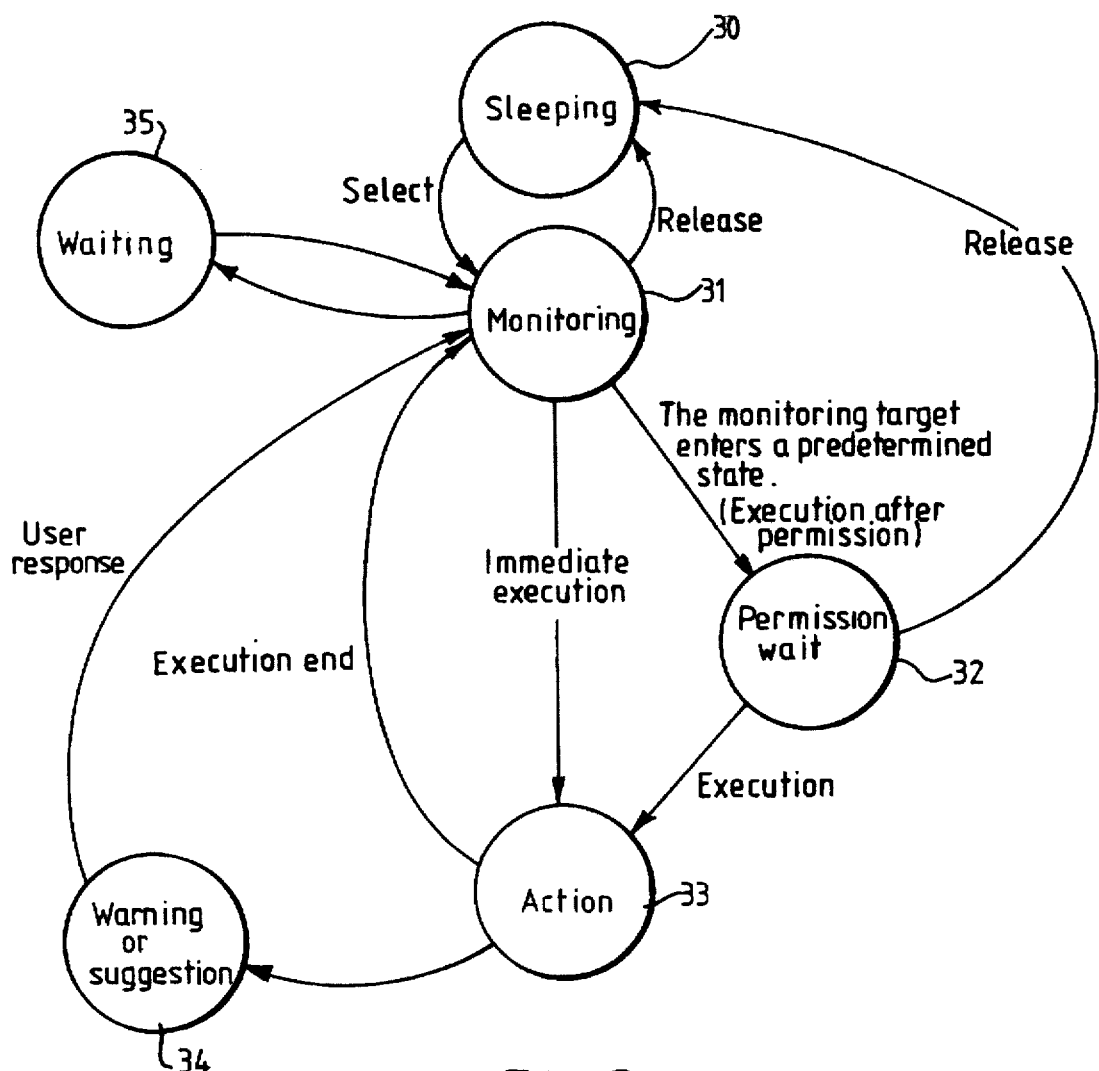
FIG. 9 shows operation stages in an automatic process which may be used in the present invention.

FIG. 9 shows a transition diagram illustrating the operation states of an automatic process 22. This example defines six operation states, being a sleeping state 30, a monitoring state 31, a permission wait state 32, an action state 33, a warning or suggestion state 34 and a waiting state 35.

The sleeping state 30 corresponds to the case where the automatic process is inactive, at its corresponding icon is in the automatic process library. The monitoring status 31 corresponds to the case where the automatic process is monitoring data. The permission wait state 32 corresponds to the case where the automatic process is waiting for permission for action, because the monitoring target is in a predetermined state. The action state 33 corresponds to the case where the automatic process is executing an action. The warning or suggestion state 34 corresponds to the case where, after executing an action, a message is generated for the user. Finally, the waiting state 35 corresponds to the case where the corresponding automatic process has been selected, but has then been rendered inactive without returning the corresponding icon to the library frame. Such a state may be desirable when the user wishes temporarily to inactivate a particular automatic process.

Assuming that the sleeping state 30 is the initial state of the process, a first transition is performed by the following procedure. First, the appropriate automatic process is selected from the automatic processes loaded in the automatic process library by the user or another automatic process. The sleeping state changes to the monitoring state 31 by a "select" instruction from the user or another automatic process, and the automatic process starts monitoring the appropriate data. That "select" instruction may correspond to the dragging of the icon corresponding to the automatic process from the library frame to the editing frame. For simplicity of use, the automatic process may be put into the monitoring state immediately after the movement of the corresponding icon as it is dragged from the library frame, has ceased. In such circumstances, there are then three possible transitions out of that monitoring state. Firstly, although the user has selected and activated the automatic process, it may be desirable temporarily to inhibit the monitoring of data by that automatic process. In this case, the user may cause the process to change to the waiting state 35, in which state it will remain until the user returns it to the monitoring state. As an alternative, the user may inactivate the automatic process by release instruction, in which case the automatic process returns to the sleeping state. The release instruction may correspond to the dragging of the corresponding icon from the editing frame to the library frame. This returns the automatic process to the automatic process library.

As shown in FIG. 9, there are two further possible transitions from the monitoring state, both being triggered by changes to the data which is being monitored. The simpler case is where the automatic process immediately begins to carry out its action on the data, corresponding to the "immediate execution" arrow in FIG. 9, and the automatic process then moves to the action state 33 and the appropriate action of the automatic process is carried out. For some automatic processes, however, it is not desirable for the action of the process to begin without user control. Therefore, some automatic processes may enter the permission wait state 32, in which state the action of the automatic process does not occur until a user signal has been supplied. If the user supplies an "execution" instruction, the automatic process changes from the permission wait state 32 to the action state 33. Alternatively, as shown in FIG. 9, the user may supply a release instruction, returning the automatic process from the permission wait state 32 to the sleeping state 30. When the automatic process is in the action state 33, it carries out an appropriate action on the data. There are then two possibilities. Firstly, the action may be completed, and the process then returns to the monitoring state 31, as shown by the "execution end" arrow in FIG. 9. Alternatively, however, it may be desirable for the automatic process to generate a message to the user, in which case the process changes to the warning or suggestion state 34 from the action state 33. For example, if the automatic process is monitoring a predetermined relationship between the data, and the user has edited the data so that the predetermined relationship has been broken, then the action of the automatic process may be to detect the breaking of that relationship, and to signal to the user a warning that the relationship has been broken, by changing to the warning or suggestion state 34. It can readily be appreciated that any information or message could be supplied to the user in this state 34, such as suggestions for further editing of the data. Once the user has made the appropriate response to the warning or suggestion generated by the automatic process in the warning or suggestion state 34, the automatic process may return to the monitoring state 31. The factors which determine whether an automatic process changes directly from the monitoring state 31 to the action state 33, or first changes to the permission waits state 32 may be determined by a suitable identifier in the set-up of the automatic process. By changing that identifier, the user may then determine whether the transition from the monitoring state 31 is direct or not. This has particular value when the user creates an new automatic process. In that case, at least for the first few times the automatic process is activated, the user may want to monitor closely the action of that automatic process, in which case it is desirable that the user knows when the automatic process will take effect. Thus, an initial transition to the permission wait state 32 permits the user to control when the automatic process carries out its action. If the user finds that the operation on the automatic process is satisfactory and reliable, detailed checking of its operation may no longer be necessary, in which case the user may then arrange for the automatic process to change directly from the monitoring state 31 to the action state 33.

Figure 10:
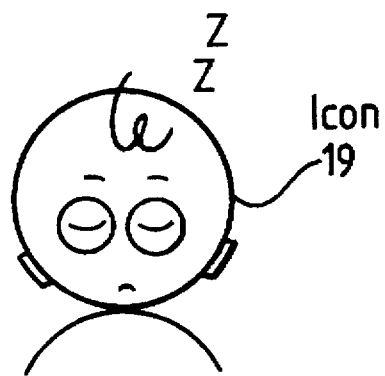
FIG. 10 illustrates possible icon configurations.
Figure 10:
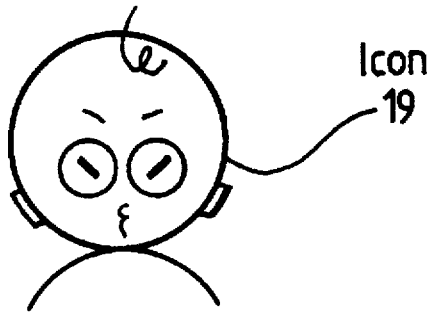
Figure 10:
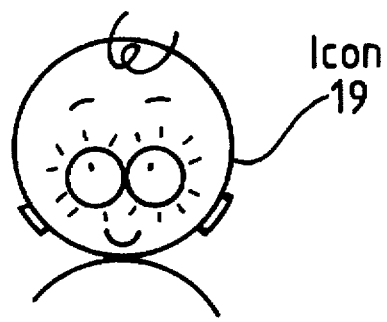
Figure 10:
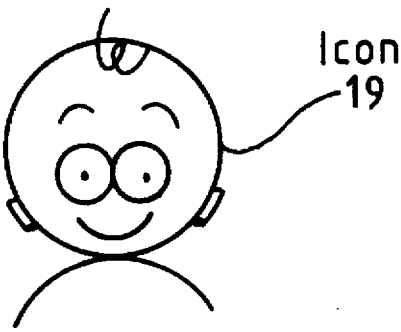
Figure 10:

FIG. 10 shows different configurations of the icon 19 corresponding to the various states of FIG. 9. As illustrated, the icon is personified, so that the user may more readily relate to the status of the operation being carried out by the automatic process. In FIG. 10, the personified icon is assumed to have the character of a workaholic.

Thus, in the sleeping state 31, the character represented by the icon 19 has its eyes closed. In the monitoring state 31, the character represented by the icon 19 has a disappointed look, because it is not working. In the permission wait state 32, the character represented by the icon 19 has an impatient look, waiting for an instruction to work. In the action state 33, the character represented by the icon 19 has a happy look, because it is working. Finally, in the warning state 34, the character represented by the icon 19 is shouting something to the user. No separate icon configuration is needed for the waiting state 35, and the same configuration as the sleeping state 30 can be used.

Figures 11A, 11B:
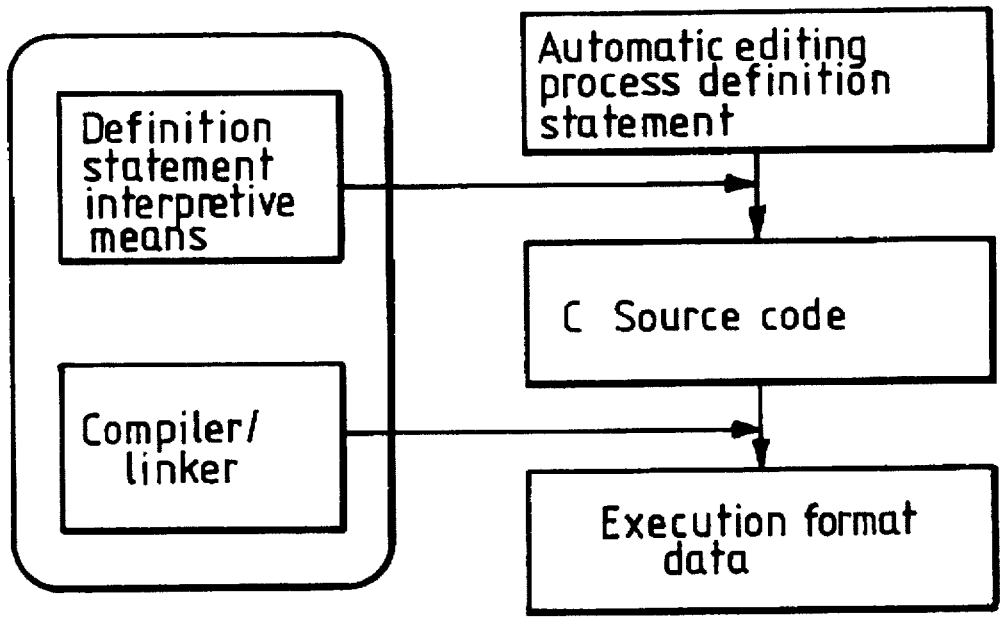
FIG. 11 shows a detail of means for defining an automatic process.

FIG. 11 shows an example of definition means for automatic processes. FIG. 11(a) shows the specification for the automatic process definition language. The monitoring specification description section and the action specification description section in the definition language use a syntax which is the same as that of an existing computer high level language (for example, the C language). FIG. 11(b) shows the procedure for creating the form of execution for the automatic processes. This procedure is executed in the system control unit 20 of FIG. 8. It is possible that variables are used as target data for monitoring or action and specified on the screen for execution.

The automatic process definition mechanism in this embodiment can define automatic processes when the user specifies the particular location of the target data on the screen as a monitoring or action target. As a result, the mechanism has the advantage that, even if the user does not recognize the detailed structure of an automatic process, he can define it easily.

Figure 12:
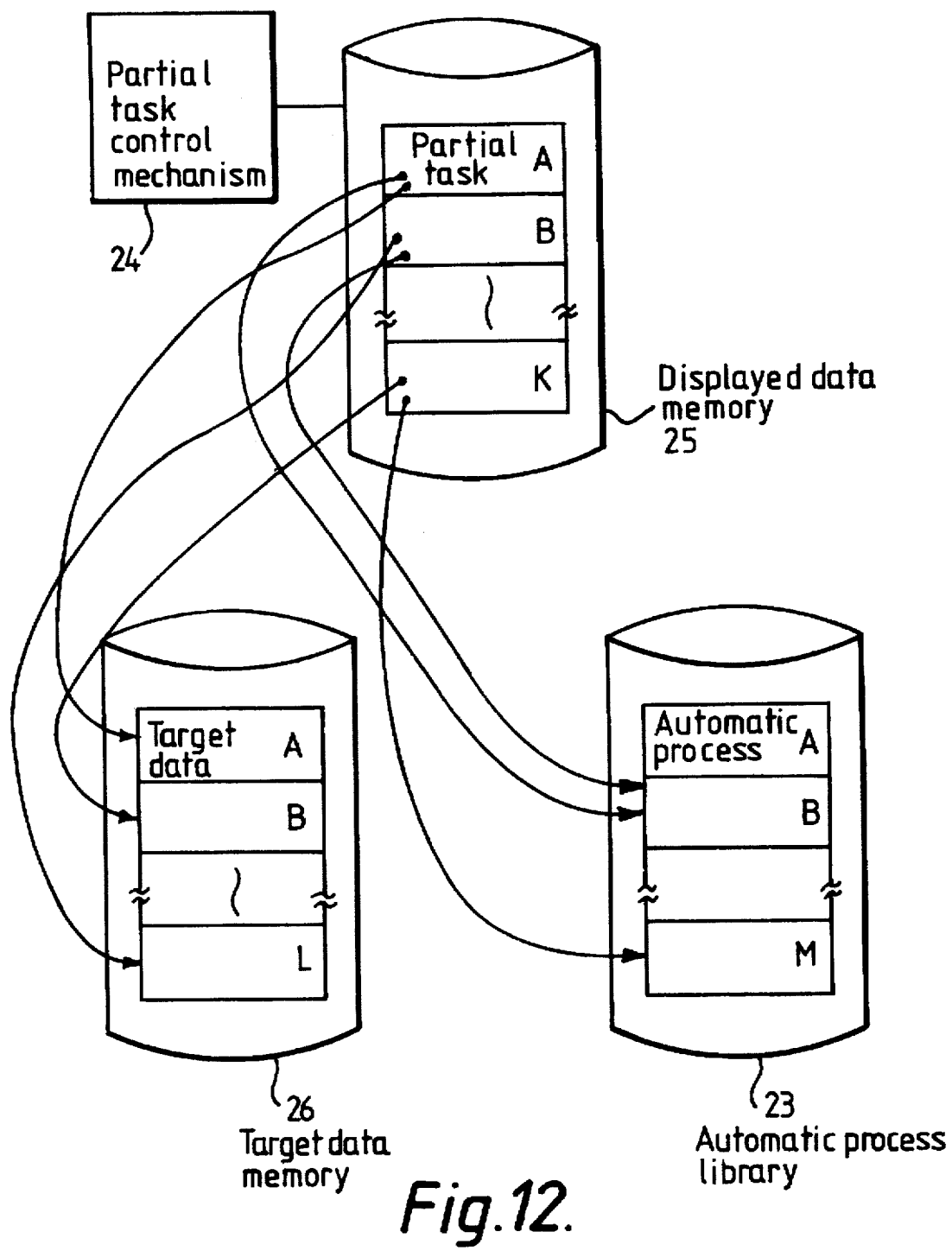
FIG. 12 is a block diagram illustrating division of automatic processes into partial tasks.

Next, an example of a partial task control mechanism will be described with reference to FIG. 12. The partial task control mechanism 24 comprises a target data memory 26 for storing target data to be edited by each partial task, automatic processes to be operated and state of the display during operation, an automatic process library 23, and a displayed data memory 25.

An editing target and an automatic process for each partial operation may be duplicated, though the state of the display is intrinsic to the partial task. In this example, an identifier for the partial task is assigned to each item of the displayed data memory 25, and the target data memory 26 and a pointer to the automatic process library 23 are provided in the displayed data memory 25. When the user specifies the identifier for the partial task, the corresponding partial task control mechanism 24 searches for the partial operation in the displayed data memory 25 and retrieves the target data and the automatic process for the partial task. The data saved for a partial task will subsequently be called "partial task data".

The partial task control mechanism stores the content of each partial task as partial task data. Therefore, when the user halts the operation once and then restarts it, he can perform the operation intermittently in a continuous environment. The partial task control mechanism copies the partial task data and creates new operation data. When new partial task data is generated by copying a similar partial task, the necessary automatic process group already exists in the new partial task data. Therefore, the possibility that the user misses some check items necessary in the procedure is small.

Next, a further example of an interactive CAD system which uses the present invention will be described. When the present invention is used in an interactive CAD system, it has the advantage that, since the mechanical but troublesome parts of the design operation may be performed by automatic processes, the designer can devote himself to the creative aspects of the operation.

In an interactive CAD system, the target data is shape model data, and the data input display unit 11 comprises a graphic display unit and a tablet mouse. To expressing a partial task, there is a method available that an operation on a drawing is assumed as a partial task and the drawing number is handled as a partial task identifier.

The following are possible operations to be allotted to the automatic processes of the interactive CAD system:

Design parameter calculations
Design rule checking
Setup for activating analytical programs
Data search
Rounding shape The task "Rounding shape" in the above list means an operation for automatically rounding or chamfering the edge which occurs on a product. Edges are generally generated simultaneously. Therefore, the automatic process may copy itself and a plurality of automatic processes process the edges in parallel. The action of the automatic processes 22 include editing the target data and controlling another automatic process 22.

FIG. 13 shows an example of the design of an interactive CAD system which uses the present invention. In this example, a partial task for determining the major dimensions of the design of an automobile body is considered. It is assumed that standard partial task data is already available.

Figure 13A:
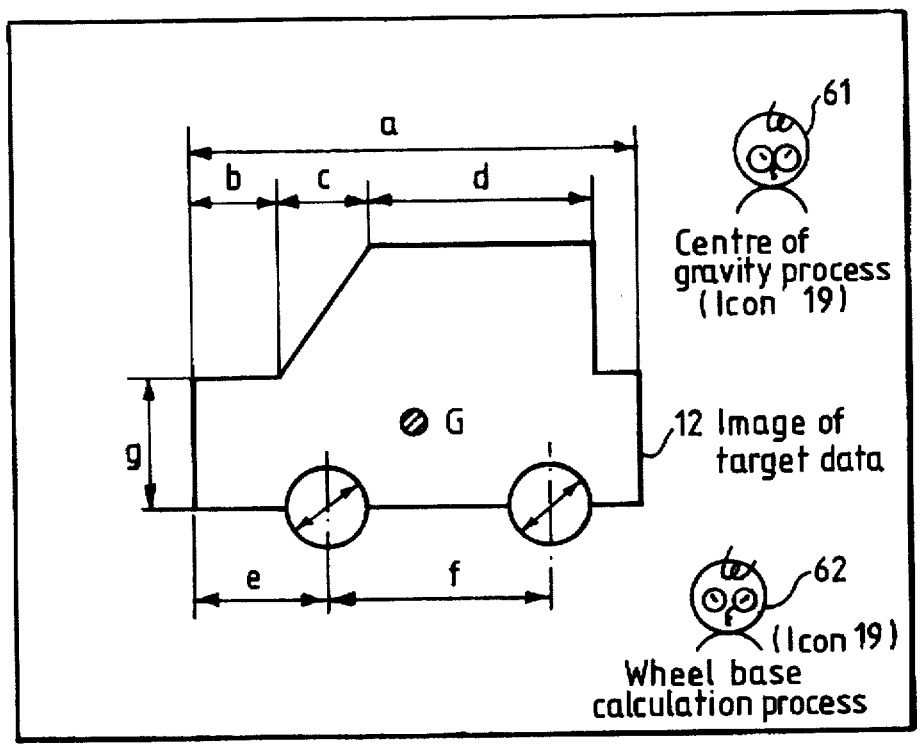
FIGS. 13(a) to (f) illustrate displays which may be generated by another embodiment of the present invention.

FIG. 13(a) shows the display generated by of the data input display unit 11 immediately after one of the standard partial task data has been called. On the display, an image 12 indicates the target data and icons 19 corresponding to the automatic processes are displayed. In the example of FIG. 13(a), two types of automatic processes operate.

(1) An automatic process 61 which calculates the weight and center of gravity G after all the dimensions are determined (center of gravity calculation process 61).

(2) An automatic process 62 which calculates the position of the front wheel "e" and the length of the wheel base "f" after the dimensions a, b, c, and d, (see FIG. 13(a)) and the weight and center of gravity G are determined (wheel base calculation process 62)

A design operation may be performed on the basis of this partial task data, for example, as shown below.

(1) Firstly the user intends to examine whether the field of view from the automobile is satisfactory. The user selects and starts an automatic process (a viewpoint calculation process) 63 for calculating the viewpoint from point E (corresponding to the position of the driver) after the dimensions b, c, d, and g are determined from the automatic process library. The appropriate icon 19 appears on the screen.

Figure 13B:
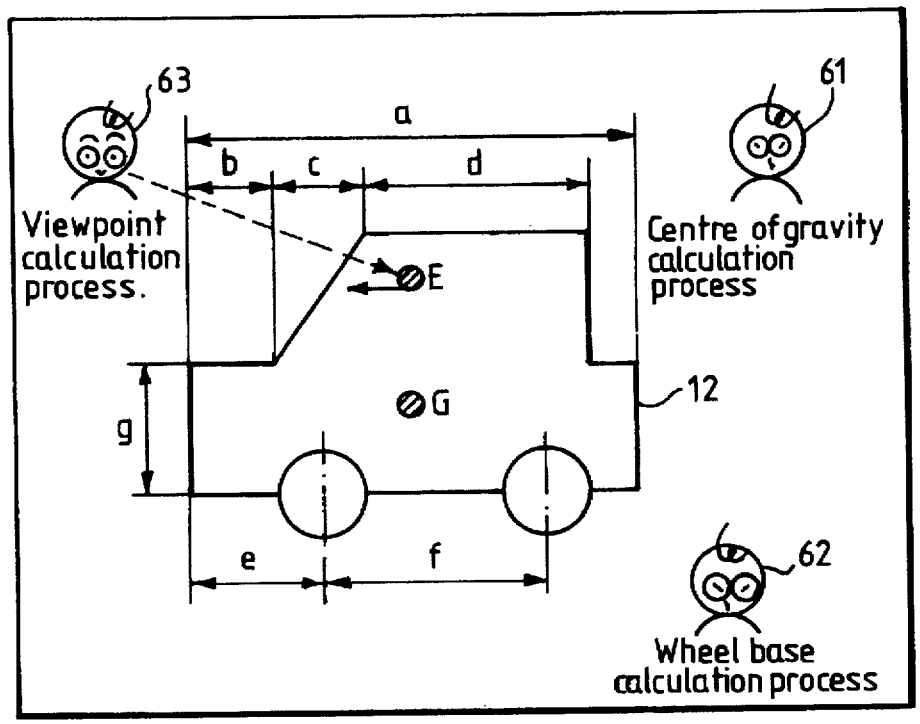

(2) The viewpoint calculation process 63 calculates the initial viewpoint E on the basis of the current values of a, c, d, and g and displays it as shown by FIG. 13(b). In FIG. 13, for clarity the position of each icon 19 is fixed and a dotted line with an arrow extends between the icon 19 and the target data on which the process acts. Alternatively, the position of the icon 19 may be moved to a location near the target data (for example, the icon for the viewpoint calculation process 63 may be moved to a location near the viewpoint E).

(3) The user changes the dimensions a and b to a' and b' parallel with the above operation of the viewpoint calculation process 63.

Figure 13C:
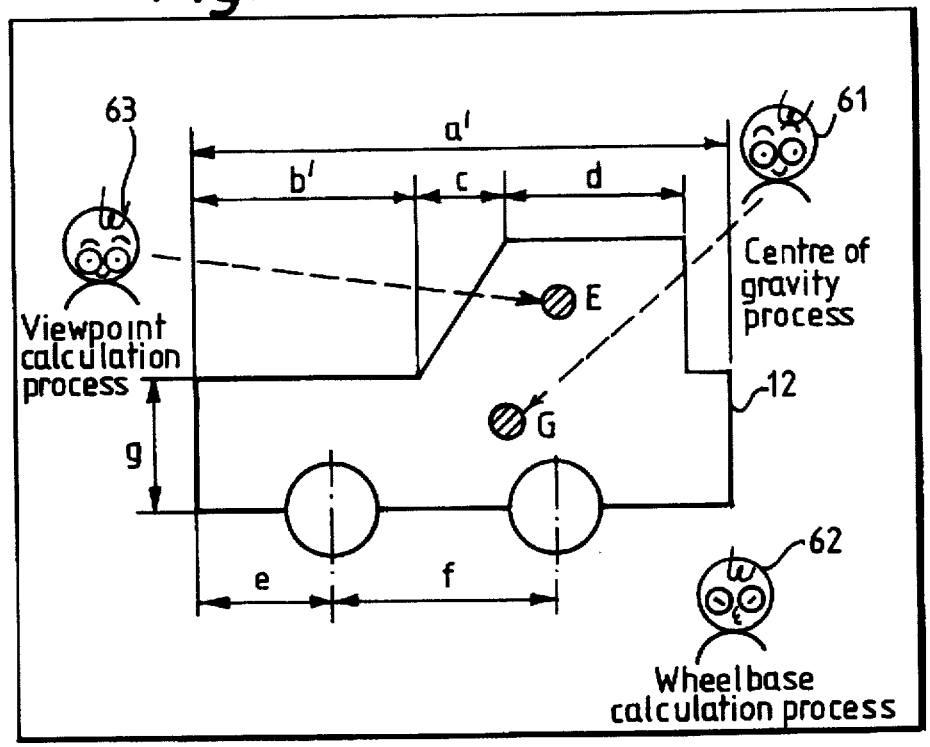

(4) The center of gravity calculation process 61 and the viewpoint calculation process 63 spontaneously operate on the basis of the new dimensions a' and b', calculate the center of gravity G and viewpoint E, and display the values on the screen, as shown by FIG. 13(c).

(5) The user then decides to start the top of the automobile body, using the result of the calculation of the viewpoint E (it is assumed that the other dimensions are not changed).

Figure 13D:
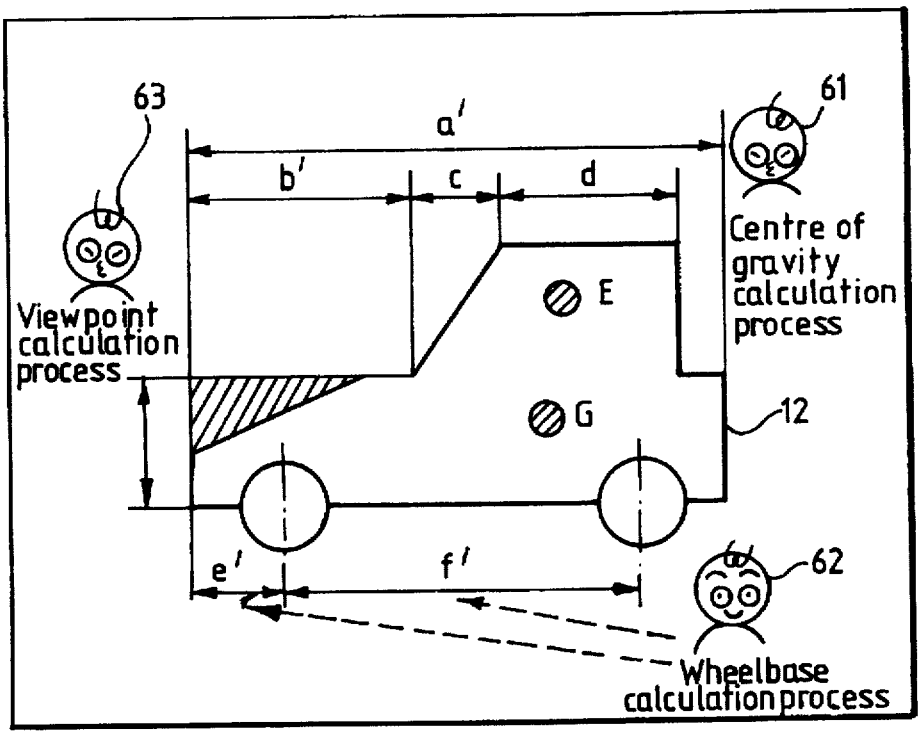

(6) The wheel base calculation process 62 determines the front wheel position "e" and the wheel base length "f" and updates the image 12 independently of the user, as shown in FIG. 13(d).

Figure 13E:
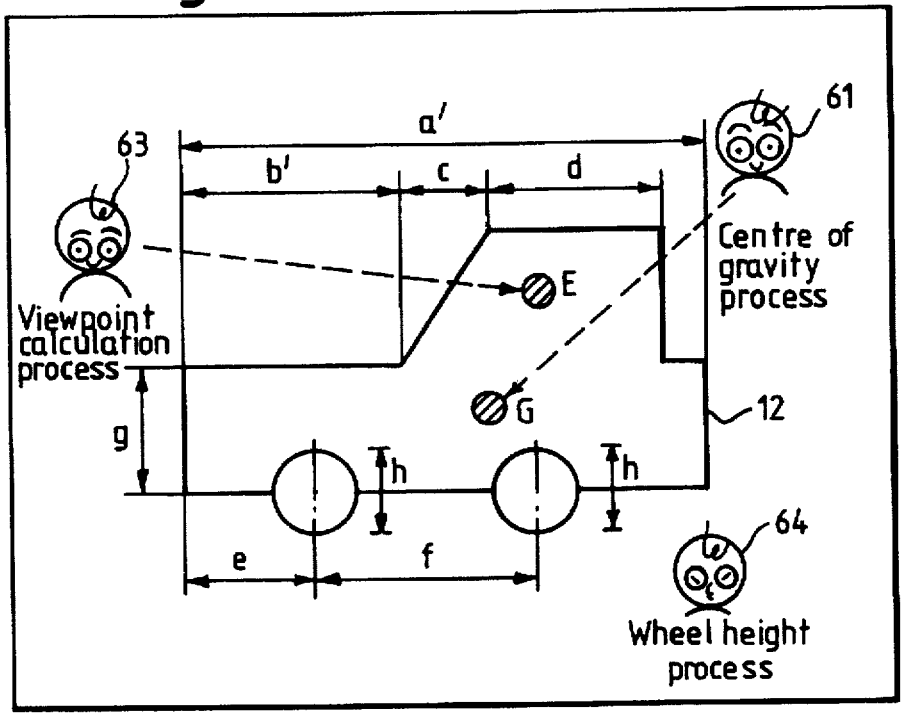
Figure 13F:
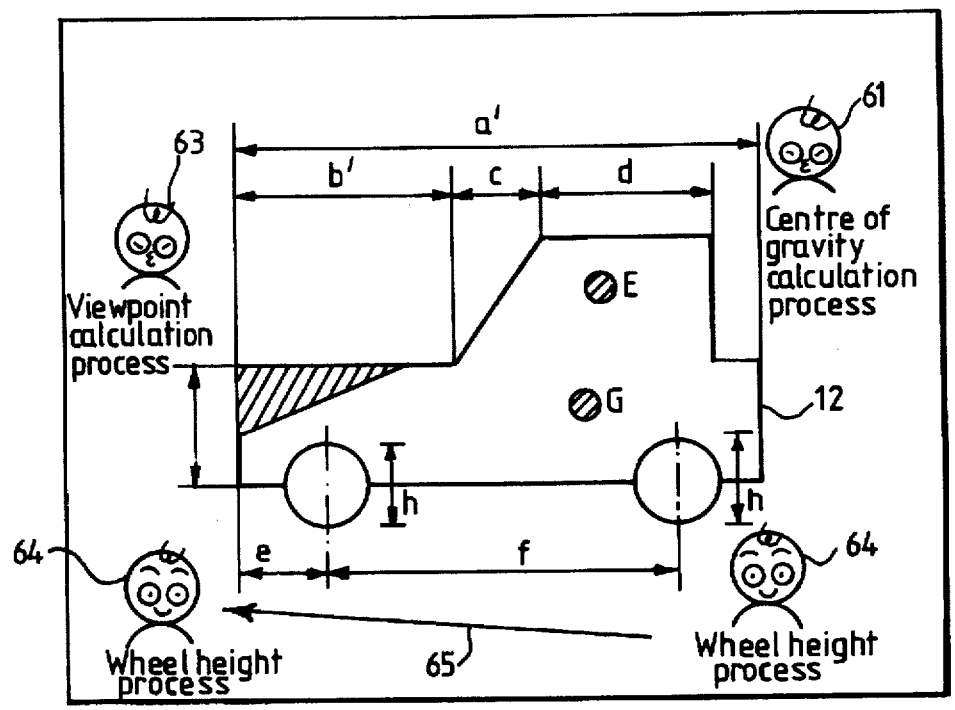

A further alternative, with reference to FIGS. 13(e) and 13(f) applies to the case where the same operation carried out on different data. FIG. 13(e) considers a base of a process which determines the wheel height h, by a wheel height process 64. For a normal automobile, the height h will be the same for the front and back wheels. Therefore, if the user changes the wheel height h, the same automatic process must operate for the front and back wheel. For the icon representing the wheel height process 64 is duplicated, as shown by arrow 65 in FIG. 13(f) so that there are then two icons representing the wheel height process 64, both of which moves to the active state, shown in FIG. 13(f) when the wheel height h is changed.

When a lot of standard partial task data are accumulated like this example, routine operations can be started only by specifying partial tasks (in this discussion the "routine operations" do not correspond to the routine operations used in known systems and the user operation sequence, for example, is not specified). This example has the advantage in that the extent of operation automation can be easily changed by adding only non-standard automatic processes. The example also has the advantage that, on the basis of partial task data created by a veteran designer, as inexperienced designer may design a product of the same type.

Figure 14:
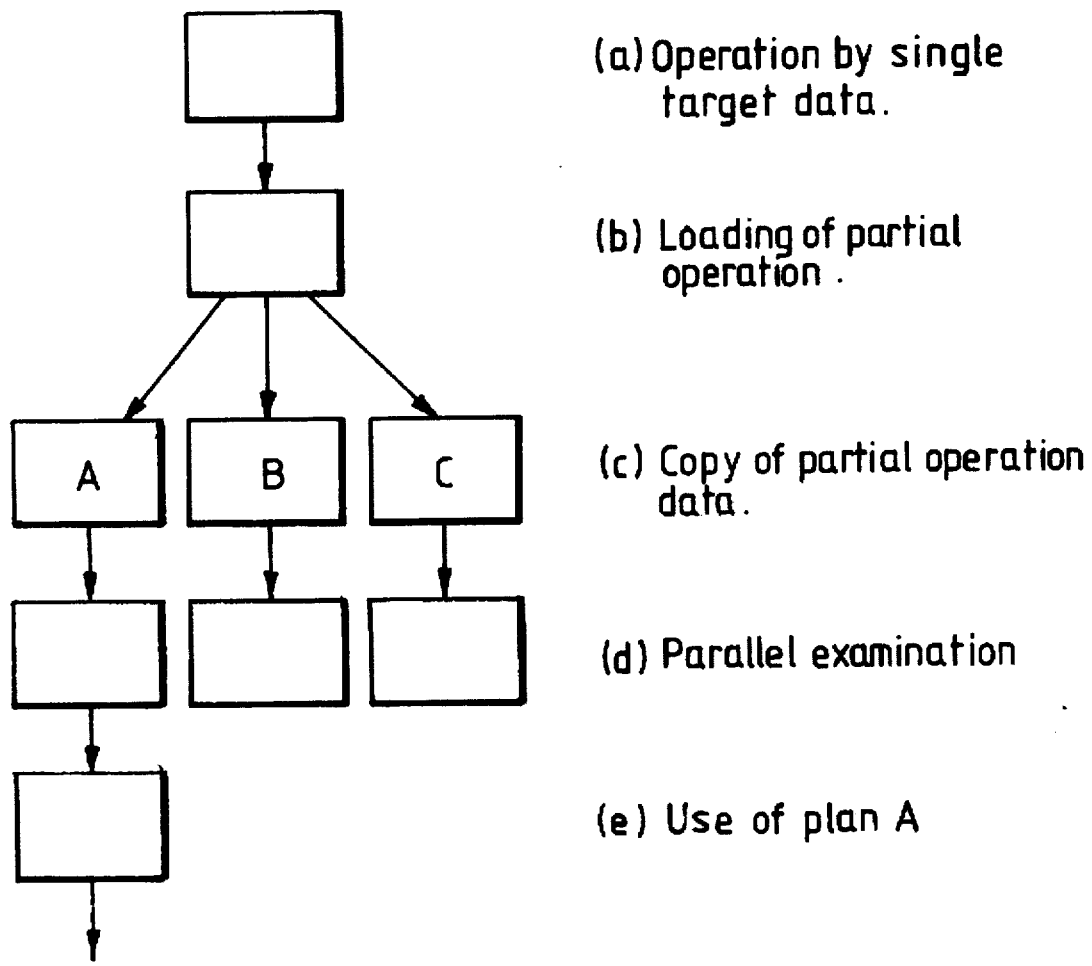
FIG. 14 shows the operation procedure for selection of alternatives, within an embodiment of the present invention.

Next, an example of the operation procedure for creating a plurality of designs in parallel, to permit editing a plurality of target data in parallel, will be described. A parallel examination operation for a plurality of designs is performed by copying the target data and assigning different automatic processes to the copied data. The same effect can be obtained by copying the partial task data. Although the partial task data includes displayed data, there is no particular problem imposed if equipment with a multi-window function is used and displayed data is assigned to each window. FIG. 14 is a flow chart showing the examination procedure for the plurality of designs. The operation is first performed using single target data (a). For examination of a plurality of designs, the current operation status is loaded as partial task data (b), and then it is copied (c). At this time, each partial task data is the same. Each of the data may become an editing target for different automatic processes thereafter or may be changed to different designs by different operations performed by the user (d) or (e).

In this embodiment, the design examination operation is loaded as a partial task. Therefore, the embodiment has the advantage that, when another design is generated, the partial task data can be re-used.

In order to control a plurality of automatic processes, it is desirable to provide an automatic process group control mechanism. A plurality of automatic processes are generally controlled by an identifier. When the user specifies the identifier, the corresponding automatic processes start. Since each automatic process executes an action in reaction to changes in the target data, flexible automation is available, as compared with a macro command whose operation procedure is fixed.

As described in FIG. 14, when a plurality of parts requiring the same type of editing exist in the target data, the automatic process copies itself and a plurality of automatic processes with the same function operate in parallel, and the editing efficiency then improves.

Furthermore, in such an editing method, the target data is copied for a target and each target data can be operated as an operation target for different automatic processes. As a result, a plurality of plans may be created in parallel and the efficiency of editing is improved.

Embodiments of the present invention are described above. Furthermore, text editor or an image editor using the present invention may be used in a CAD (computer graphics (CG)), presentation system, or various office automation units.

In the present invention, routine operations are performed by automatic processes and the user can edit data only when a more complex decision is required. Therefore, the efficiency of operation, including non-routine operations may be improved.

Furthermore, the user does not need to memorize commands in detail and can check visually the status of each automatic process. Therefore, the present invention has the advantage that the operation efficiency is improved and a user friendly system may be constructed.

What is claimed is:

1. A method of editing data, comprising the steps of:
   defining a plurality of automatic processes for automatically investigating a plurality of relationships between said data and respective corresponding visual indicators thereof;
   displaying at least one of said visual indicators on a display;
   displaying at least some of said data as an image on said display;
   selecting on said display, by a user-controlled selection instruction, at least one of said visual indicators representing one of said plurality of automatic processes so as to activate at least one of said automatic processes;
   editing on said display said data by a user controlled editing instruction;
   automatically investigating the relationships between said data corresponding to said at least one selected automatic process in parallel with said data editing step; and
   generating on said selected visual indicator of the status of said automatic investigation by said at least one selected automatic process, said visual indicator being located relative to the image on said display at a point which links the part of said display which said selected automatic process investigates and the image of said part of said data.

2. A method according to claim 1, wherein at least some of said plurality of automatic processes are arranged to edit at least some of said data during the automatic investigation of said relationships by said at least some of said plurality of automatic processes.

3. A method according to claim 2, wherein, when one of said selected automatic processes edits data also edited by said user, said visual indication for said one of said selected automatic processor is located on said display adjacent a user-controlled cursor for said editing by said user-controlled editing instruction.

4. A method according to claim 2, wherein, when at least two of said selected automatic processes edit the same data, said visual indication for said at least two of said automatic processes are located adjacent each other on said display.

5. A method according to claim 1, wherein at least one of said automatic processes is defined by a user-selected definition instruction.

6. A method according to claim 1, wherein, after selection of said at least one of said plurality of automatic processes, said automatic investigation by said at least one selected automatic process is temporarily inhibited by a user-controlled inhibition instruction.

7. A method according to claim 1, wherein said automatic investigation by said at least one selected automatic process includes delaying the start of said investigation until the supply of a user-controlled start instruction.

8. A method according to claim 1, wherein a selected plurality of said automatic processes are selected, and at least some of said selected plurality of automatic processes are arranged to investigate said relationships concurrently.

9. A method according to claim 1, wherein, when at least two of said relationships are the same, said visual indication is the same for each.

10. A method according to claim 1 wherein said visual indication indicates the start of said investigation.

11. A method according to claim 1 wherein said visual indication indicates that said automatic investigation is occurring.

12. A method according to claim 1, wherein said visual indication indicates the completion of said automatic investigation.

13. A method according to claim 1 wherein the appearance of said visual indication on said display changes during said automatic investigation, thereby to indicate changes in the progress of said automatic investigation.

14. A method according to claim 1, wherein, prior to said editing of said data, there is a visual indication on said display indicating the selection of said at least one selected automatic process.

15. A method according to claim 1, wherein said visual indication indicates a request for the user to request a message to the user.

16. A method of editing data, comprising the steps of:
    displaying at least some of said data as an image on a display;
    editing on said display said data by a user-controlled editing instruction; and
    monitoring said data using at least one automatic process in parallel with said data editing step, said monitoring including automatically investigating at least one predetermined relationship between said data;
    wherein the progress of said automatic investigating of said data is indicated on said display by a corresponding icon associated with said at least one automatic process, and the appearance of said icon on said display changes during said automatic investigating, said icon being located relative to the image on said display at a point which links the part of said data which said automatic process associated with said icon investigates and the image of that part of said data, thereby to indicate changes in the progress of said automatic investigating.

17. A method according to claim 16 wherein said icon indicates the start of said investigation.

18. A method according to claim 16 wherein said icon indicates that said automatic investigation is occurring.

19. A method according to claim 16, wherein said icon indicates the completion of said automatic investigation.

20. A method according to claim 16, wherein there are plurality of said automatic processes and a plurality of predetermined relationships.

21. A method according to claim 20, further including the step of selecting, by a user-controlled selection instruction, at least one of said plurality of automatic processes, thereby to permit user selection of at least one of said automatic processes.

22. A method according to claim 21, wherein each of said plurality of automatic processes is indicated by a corresponding icon, and said display has a first part and a second part, said image being located in said second part of said display, and movement of an icon from said first part to said second part of said display indicating the selection of the automatic process corresponding to the moved icon.

23. A method according to claim 22, wherein said first part of said display displays a plurality of icons corresponding to said plurality of automatic processes.

24. A method according to claim 22, wherein said plurality of automatic processes are divided into a plurality of groups and said first part of said display displays icons corresponding to a selected one of said groups.

25. A method according to claim 22, wherein said display has at least one icon corresponding to a group of said automatic processes, thereby to permit simultaneous selection of said automatic processes corresponding to said group.

26. A method according to claim 21, wherein, after selection of said at least one of said plurality of automatic processes, said automatic investigation by said at least one selected automatic process is temporarily inhibited by a user-controlled inhibition instruction.

27. A method according to claim 21, wherein said automatic investigation by said at least one selected automatic process includes delaying the start of said investigation until the supply of a user-controlled start instruction.

28. A method according to claim 21, wherein a selected plurality of said automatic processes are selected, and at least some of said selected plurality of automatic processes are arranged to investigate said relationships concurrently.

29. A method according to claim 20 wherein there are a plurality of said icons, and there is a one-to-one relationship between each icon and a corresponding automatic process.

30. A method according to claim 16, wherein, when at least two of said relationships are the same, said icon is the same for each.

31. A data editing apparatus, comprising:

a display for displaying a plurality of automatic processes for automatically investigating a plurality of relationships between said data;

user-controlled input means for selecting on said display at least one of a plurality of visual indicators, each representing one of said plurality of automatic processes, and supplying an editing instruction for editing said data;

means for editing on said display said data in response to said editing instruction; and analysis means for causing said at least one elected automatic process to investigate the corresponding relationship between said data in parallel with said data editing means, and generating on said selected visual indicator of the status of said automatic investigation by said at least one selected automatic process, said visual indication being located relative to the image on said display at a point which links the part of said data which said selected automatic process investigates and the image of that part of said data.

32. A data editing apparatus, comprising:

a display for displaying data thereon as an image; means for storing at least one automatic process for automatically investigating at least one predetermined relationship between said data, and displaying images on said display representing said at least one automatic process;

means for editing said data in response to an editing instruction; and analysis means for causing said at least one automatic process to monitor said data in parallel with said data editing means, including automatically investigating said at least one predetermined relationship, generating on said display said icon associated with said at least one monitoring automatic process, and causing the appearance of said icon to change during said automatic investigating, said icon being located relative to the image on display at a point which links the part of said data which said automatic process associated with said icon investigates and the image of that part of said data, thereby to indicate changes in the progress of said automatic investigating.

33. A data editing apparatus, comprising:

user-controlled input means;

a display, said display having a first part containing a plurality of user-selectable icons, and a second part containing an image representing data to be edited;

means for causing at least one of said user-selectable icons to move on said display from said first part thereof to said second part; and means for causing an automatic process corresponding to said at least one moved icon to investigate automatically a relationship between said data in parallel with said user-controlled input means and for causing said at least one moved icon to indicate the status of said automatic investigation, said icon being located relative to the image on said display at a point which links the part of said data which said automatic process associated with said moved icon investigates and the image of that part of said data.

34. A data editing apparatus, comprising:

user-controlled input means;

a display, said display having a first part containing a plurality of user-selectable icons, and a second part containing an image representing data to be edited;

means for causing at least one of said user-selectable icons to move on said display from said first part thereof to said second part; and means for causing an automatic process corresponding to said at least one moved icon to investigate automatically a relationship between said data in parallel with said user-controlled input means and for causing the appearance of said at least one icon to change on said display thereby to indicate changes in the progress of said automatic investigation, said icon being located relative to the image on said display at a point which links the part of said data which said automatic process associated with said moved icon investigates and the image of that part of said data.

* * * * *